J. A. MIDDLETON.
Improvement in Apparatus for Mixing and Preparing
Materials for the Manufacture of Drain-Pipes, &c.
No. 131,366. Patented Sep. 17, 1872.
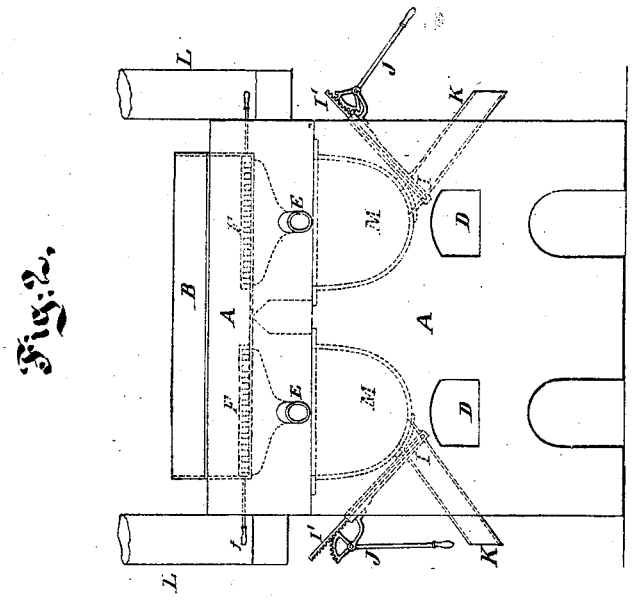
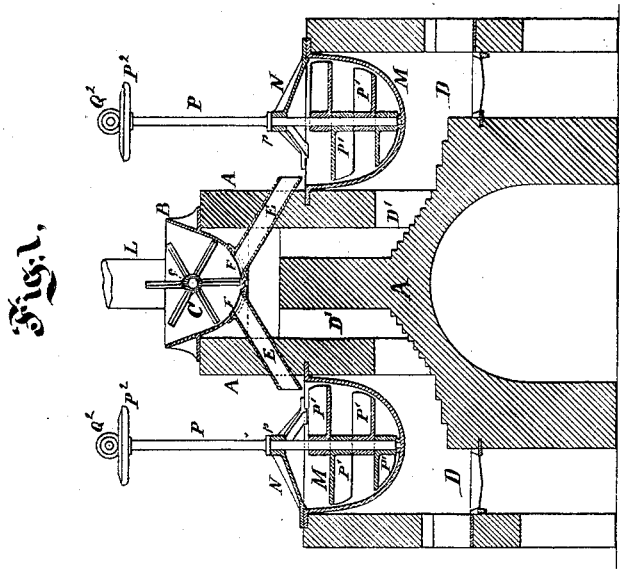
Witnesses:
Inventor:

UNITED STATES PATENT OFFICE.

JOHN A. MIDDLETON, OF WILLIAMSBURG, NEW YORK.

IMPROVEMENT IN APPARATUS FOR MIXING AND PREPARING MATERIALS FOR THE MANUFACTURE OF DRAIN-PIPES, &c.

Specification forming part of Letters Patent No. 131,366, dated September 17, 1872.

*To all whom it may concern:*

Be it known that I, JOHN A. MIDDLETON, of Williamsburg, in the county of Kings and State of New York, have invented certain Improvements in Furnaces and accompanying Apparatus for Preparing Hot Compositions, of which the following is a specification:

The apparatus is intended more particularly for mixing compositions of fine earthy matter with asphalt and other cementing materials for the manufacture of drain-pipes; and will be so described. I associate a number of mixing-vessels in which to prepare the composition, so that they can all be heated very efficiently by a small number of furnaces and provide convenient means for preliminarily heating the earthy material, agitating it, and introducing it to the mixers; and also means for conveniently and efficiently controlling the discharge from the mixers into the molds.

The following is a description of what I consider the best means of carrying out the invention. The accompanying drawing forms a part of this specification.

Figure 1 is a vertical section on the line S S in Fig. 2. Fig. 2 is a side elevation with certain parts omitted.

Similar letters of reference indicate like parts in all the figures.

B is a long vessel, nearly semi-cylindrical in its interior form, and provided with ledges by which it is supported on the brick-work A. In it is revolved an agitator, C, mounted on a hollow shaft, $c$, and turned by a proper gearing, not represented, from a steam-engine or other motive power. The sand is let down by a spout from a floor above, or otherwise introduced as required into the sand-pan B, and is exposed to the spent heat from the furnaces D, from which the hot products of combustion rise through the flues D', after having spent their fiercest heat on the mixing-vessels M. The heat thus transferred to the sand-pan B, in connection with the agitation from the wheel or wheels C, imparts a uniform temperature of some four or five hundred degrees to the vessel B and its contents. The hot sand is discharged as required from this vessel B into the kettles M, through the sand-chutes E, controlled by long sliding valves analogous to registers marked F, operated by handles from the outside marked $f$. There are four of the kettles or mixing-vessels M, arranged as represented, and agitated to deliver their material either simultaneously or alternately. Each is provided with a revolving shaft and means for operating it. A description of one will suffice for the whole. P is an upright shaft supported by a collar, $p$, bearing on the bridge-tree or spider N, which extends over the kettle M. The shaft P and its connections carry at the bottom screw-blades $P^1$ and near its upper end a beveled gear-wheel, $P^2$, which receives motion from a beveled gear-wheel, $Q^2$, on a shaft, not represented, driven by power. There may be clutches or other suitable devices for putting the several shafts, P, and their connections into operation and throwing them out at will.

I make a highly-successful composition for drain-pipes of sand, clay, resin, and sulphur, using as little of the latter elements as will suffice to thoroughly cement together and form a strong, hard, compound with the earthy materials.

The hot sand from the pan B is discharged successively through the chutes E into the several kettles M, and is there mingled with the proper proportions of resin, asphalt, or analogous cementing material, the material being agitated together so as to coat all the particles of the sand. Fine dry clay is now added and thoroughly stirred with it, and, lastly, the necessary small proportion of powdered sulphur is incorporated in the same manner, immediately on which the now soft but rapidly-hardening material is discharged through chutes K, under the control of valves I, operated by racks I' and levers with geared segments J. The effect of the sulphur is to harden the compound. It will be understood that the compound hardens on cooling to form a dense stony mass, and that the hardening is largely induced by the vulcanizing or analogous effect due to the heat and the sulphur. Experiment has shown that the material hardens rapidly even while the heat is maintained, and this fact induces peculiar difficulties in the mixing and molding of the compound. This apparatus overcomes several of the serious difficulties. The molds may be presented below the spouts K, at the proper times, by carrying them on small cars, not represented. Operating the lever J to open the gate I, the material pours down and fills the mold. It is preferable that a mold of sufficient size or a sufficient number of molds be presented at once or in quick succession to receive the entire contents of a mixer, M, so that on closing the gate I, by an opposite movement of the lever J, entirely fresh materials may be introduced in the mixer M. The operation is repeated in the several mixers successively, and the work may continue for an indefinite period—heating, mixing, and delivering, efficiently, rapidly, and with little labor.

There may be many additions to the apparatus here shown, such as covers with passages to convey away fumes, appliances for moving the sand in the pan B from one end which receives it, so as to allow it to become considerably heated before it reaches the sand-chutes E; and obviously blowers, dampers, and the like, to aid in controlling the fires. The smoke-pipe for the final discharge of the hot products of combustion, is represented by L; but it may be much further off, so as to allow a long passage under a fixed or revolving pan, in which the sand may be partially heated before it is delivered into the pan B.

I claim as my invention—

1. The vessels M, agitating means P, and spouts K, arranged, as represented, relatively to the furnaces D, and to suitable means for heating and delivering material, as herein represented.

2. The pan B, with its agitator C and spouts E, in combination with the vessels M and furnaces and flues D D', and arranged for joint operation, as and for the purposes specified.

3. The specific construction and arrangement of the gates I I' J relatively to the mixing-vessels M, spouts K, and furnaces D, as herein specified.

In testimony whereof I have hereunto set my hand this 11th day of May, 1872, in the presence of two subscribing witnesses.

J. A. MIDDLETON.

Witnesses:
   CHARLES H. HULL,
   W. C. DEY.